US012682063B2

(12) United States Patent
Nakajima et al.

(10) Patent No.: US 12,682,063 B2
(45) Date of Patent: Jul. 14, 2026

(54) SHARING SYSTEM, SHARING METHOD, COUNTERMEASURE DEVICE, AND STORAGE MEDIUM

(71) Applicant: NEC Corporation, Tokyo (JP)

(72) Inventors: Kazuaki Nakajima, Tokyo (JP); Io Furuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 18/701,309

(22) PCT Filed: Nov. 9, 2021

(86) PCT No.: PCT/JP2021/041078
§ 371 (c)(1),
(2) Date: Apr. 15, 2024

(87) PCT Pub. No.: WO2023/084563
PCT Pub. Date: May 19, 2023

(65) Prior Publication Data
US 2024/0411885 A1 Dec. 12, 2024

(51) Int. Cl.
*G06F 21/57* (2013.01)

(52) U.S. Cl.
CPC .................................... *G06F 21/57* (2013.01)

(58) Field of Classification Search
CPC ...................................................... G06F 21/57
See application file for complete search history.

(56) References Cited

U.S. PATENT DOCUMENTS

2022/0121513 A1* 4/2022 Shibayama ......... G06F 11/0727
2023/0099424 A1* 3/2023 Hawkinson ......... H04L 41/0893
709/224

FOREIGN PATENT DOCUMENTS

JP        2005-259014 A        9/2005
JP        2013-025429 A        2/2013
JP        2016-200991 A        12/2016
JP        2017-162243 A        9/2017
JP        2017-167695 A        9/2017
(Continued)

OTHER PUBLICATIONS

International Search Report for PCT Application No. PCT/JP2021/041078, mailed on Feb. 1, 2022.
(Continued)

*Primary Examiner* — Beemnet W Dada
(74) *Attorney, Agent, or Firm* — Sughrue Mion, PLLC

(57) ABSTRACT
A sharing system according to an aspect of the present disclosure includes: at least one memory storing a set of instructions; and at least one processor configured to execute the set of instructions to: receive countermeasure information from a countermeasure device configured to generate the countermeasure information representing a countermeasure against an abnormal state in a case where log information representing a security state of a target device indicates the abnormal state; notify the target device of the received countermeasure information; receive an effect of the countermeasure against the abnormal state from the countermeasure device that determines the effect of the countermeasure from the log information after notification of the countermeasure information; and provide effect information representing the effect to a predetermined effect information provision target.

17 Claims, 8 Drawing Sheets

(56)         References Cited

FOREIGN PATENT DOCUMENTS

JP       2018-045327  A      3/2018
JP       2018-077597  A      5/2018

OTHER PUBLICATIONS

English translation of Written opinion for PCT Application No.
PCT/JP2021/041078, mailed on Feb. 1, 2022.

* cited by examiner

SHARING SYSTEM, SHARING METHOD, COUNTERMEASURE DEVICE, AND STORAGE MEDIUM

This application is a National Stage Entry of PCT/JP2021/ 041078 filed on Nov. 9, 2021, the contents of all of which are incorporated herein by reference, in their entirety.

TECHNICAL FIELD

The present disclosure relates to a technology for sharing information.

BACKGROUND ART

A technology related to sharing of information regarding security is disclosed in the following document.

PTL 1 discloses a security countermeasure search device that receives an extraction condition for searching for a security countermeasure and extracts security countermeasure information correlated with the received extraction condition from a security countermeasure database. The security countermeasure search device displays the extracted security countermeasure information in order of priority. The security countermeasure search device receives the usefulness information of the security countermeasure, and reflects the received usefulness information in the security countermeasure database.

PTL 2 describes a security evaluation device that calculates a target index value that is an input target effect index value and an implementation index value that is an effect index value of a security countermeasure being implemented, and outputs comparison information obtained by comparing the target index value and the implementation index value as an evaluation result.

PTL 3 describes an information security system that analyzes attack information on a plurality of autonomous systems to specify an autonomous system that is under similar attack, and specifies a difference in security information of the specified autonomous system. The information security system transmits, to an information sharing device, notification information based on a difference between pieces of security information that the first autonomous system has and that the second autonomous system does not have among the specified autonomous systems. The information sharing device transmits the notification information to the second autonomous system. The second autonomous system implements a security countermeasure against the attack based on the notification information.

PTL 4 discloses a security countermeasure drafting support system that enumerates security countermeasures that can be introduced for each threat item based on components included in an attack path of a threat item and a target part of the security countermeasure. From a relationship between a target point of the security countermeasure and an effect value indicating the degree of effect of the security countermeasure, the system calculates, as the system risk reduction effect of the security countermeasure, the sum of the effect values of the threat items for which the risk is reduced when the security countermeasure is introduced for each of the listed security countermeasures.

CITATION LIST

Patent Literature

PTL 1: JP 2005-259014 A
PTL 2: JP 2013-025429 A

PTL 3: JP 2017-162243 A
PTL 4: JP 2018-077597 A

SUMMARY OF INVENTION

Technical Problem

According to the technique of PTL 1, the usefulness of security information can be known. According to the technique of PTL 2, it is possible to compare the effect of the implemented security countermeasure with the target by the index value. According to the technology of PTL 3, it is possible to equalize security countermeasures of the plurality of autonomous systems receiving the same attack. According to the technique of PTL 4, it is possible to compare the effects of risk reduction by security countermeasures. However, in the techniques of PTLs 1 to 4, it is not possible to improve the swiftness of disclosure and the ease of adjustment of the range of disclosure of the information regarding the security.

An example of an object of the present disclosure is to provide a sharing system or the like that can improve the swiftness of disclosure and the ease of adjustment of the range of disclosure of information regarding security.

Solution to Problem

A sharing system according to an aspect of the present disclosure includes: countermeasure reception means for receiving countermeasure information from a countermeasure device configured to generate the countermeasure information representing a countermeasure against an abnormal state in a case where log information representing a security state of a target device indicates the abnormal state; countermeasure notification means for notifying the target device of the received countermeasure information; effect reception means for receiving an effect of the countermeasure against the abnormal state from the countermeasure device that determines the effect of the countermeasure from the log information after notification of the countermeasure information; and effect information provision means for providing effect information representing the effect to a predetermined effect information provision target.

A sharing method according to an aspect of the present disclosure includes: receiving countermeasure information from a countermeasure device that generates the countermeasure information representing a countermeasure against an abnormal state in a case where when the log information representing a security state of a target device indicates the abnormal state; notifying the target device of the received countermeasure information: receiving an effect of the countermeasure against the abnormal state from the countermeasure device that determines the effect of the countermeasure from log information after notification of the countermeasure information; and providing effect information representing the effect to a predetermined effect information provision target.

A storage medium according to an aspect of the present disclosure stores a program for causing a computer to execute: countermeasure reception processing of receiving countermeasure information from a countermeasure device that generates countermeasure information indicating a countermeasure against an abnormal state in a case where log information indicating a security state of a target device indicates the abnormal state; countermeasure notification processing of notifying the target device of the received countermeasure information; effect reception processing of receiving the effect from the countermeasure device that determines the effect of the countermeasure against the abnormal state from the log information after notification of the countermeasure information; and effect information provision processing of providing effect information representing the effect to a predetermined effect information provision target.

A countermeasure device according to an aspect of the present disclosure includes: log reception means for receiving log information indicating a security state output from a target device; countermeasure generation means for generating countermeasure information indicating a countermeasure against an abnormal state in a case where the log information indicates the abnormal state; countermeasure provision means for providing the countermeasure information; effect determination means for determining an effect of the countermeasure from post-countermeasure log information that is log information received after the provision of the countermeasure information; and effect transmitting means for outputting effect information indicating the effect.

An analysis method according to an aspect of the present disclosure includes: receiving log information indicating a security state output from a target device; generating countermeasure information indicating a countermeasure against an abnormal state in a case where the log information indicates the abnormal state; providing the countermeasure information: determining an effect of the countermeasure from post-countermeasure log information that is log information received after the provision of the countermeasure information; and outputting effect information representing the effect.

A storage medium according to an aspect of the present disclosure stores a program for causing a computer to execute: log reception processing of receiving log information indicating a security state output from a target device; countermeasure generation processing of generating countermeasure information indicating a countermeasure against an abnormal state when the log information indicates the abnormal state; countermeasure provision processing of providing the countermeasure information; effect determination processing of determining an effect of the countermeasure from post-countermeasure log information which is log information received after the provision of the countermeasure information; and effect transmitting processing of outputting effect information indicating the effect.

Advantageous Effects of Invention

The present disclosure has an effect that it is possible to improve the swiftness of disclosure and the ease of adjustment of the range of disclosure of information regarding security.

EXAMPLE EMBODIMENT

Hereinafter, example embodiments of the present disclosure will be described in detail with reference to the drawings.

First Example Embodiment

First, a first example embodiment of the present disclosure will be described in detail with reference to the drawings.
<Configuration>

Figure 1:
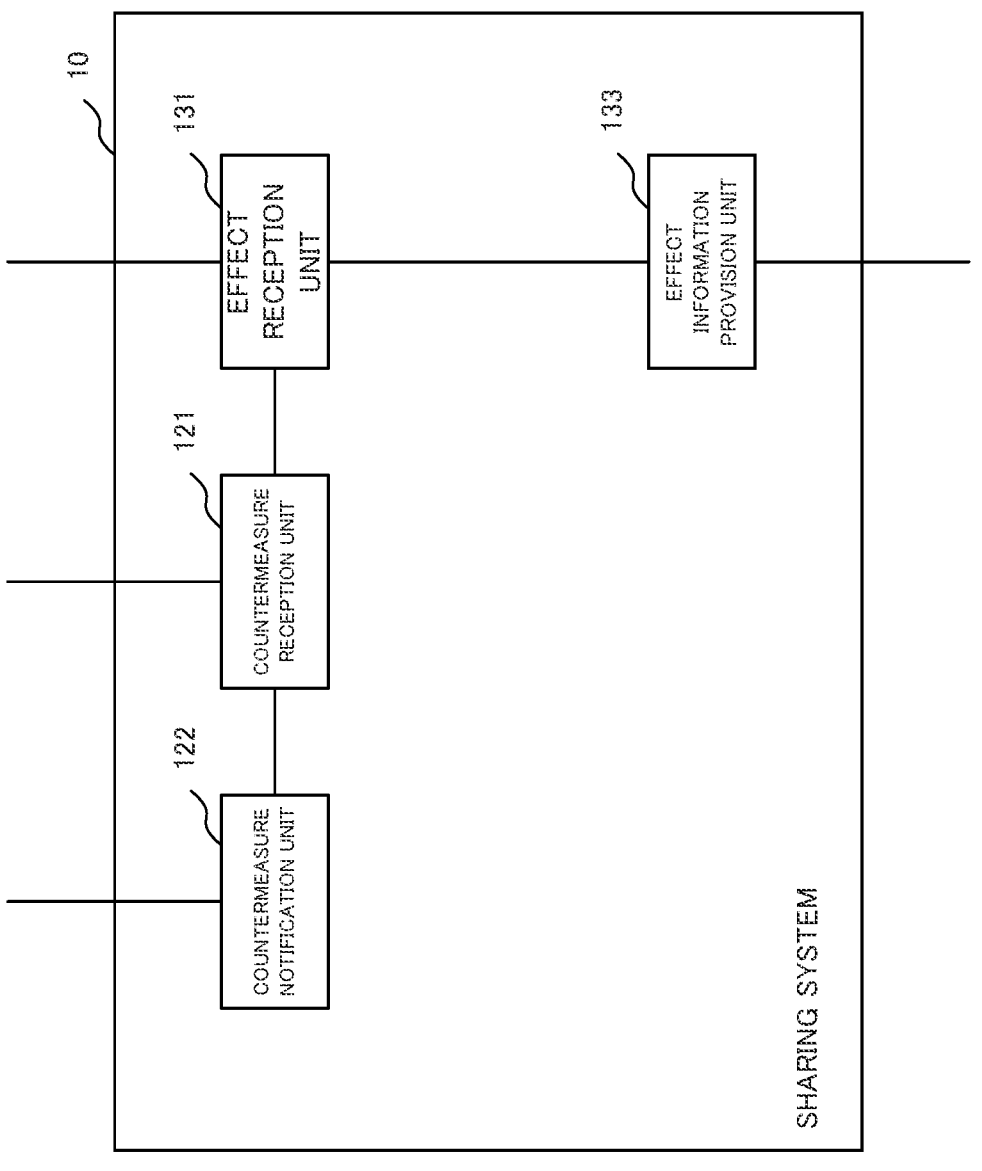
FIG. 1 is a block diagram illustrating an example of a configuration of a sharing system according to a first example embodiment of the present disclosure.

FIG. 1 is a block diagram illustrating an example of a configuration of a sharing system according to the first example embodiment of the present disclosure. In the example illustrated in FIG. 1, a sharing system 10 according to the present example embodiment includes a countermeasure reception unit 121, a countermeasure notification unit 122, an effect reception unit 131, and an effect information provision unit 133. When log information indicating a security state of a target device indicates an abnormal state, the countermeasure reception unit 121 receives countermeasure information from a countermeasure device that generates the countermeasure information indicating a countermeasure against the abnormal state. The countermeasure notification unit 122 notifies the target device of the received countermeasure information. The effect reception unit 131 receives the effect from the countermeasure device that determines the effect of the countermeasure on the abnormal state from the log information after notification of the countermeasure information. The effect information provision unit 133 provides effect information indicating the effect to a predetermined effect information provision target.

The target device described above is, for example, a network device such as a router or a switch. The log information may be, for example, information including an alert regarding security. In the description of the present disclosure, the log information is also referred to as a log object. The alert related to security may indicate information related to an attack received by the target information. The information regarding the attack may be information representing information (that is, an abnormal state) indicating an abnormal operation or an abnormal state of the target device caused by the attack. The countermeasure information may be information representing a countermeasure regarding security that can be interpreted by the target device. In other words, the target device to which the countermeasure information is notified receives the countermeasure information and executes the countermeasure indicated by the countermeasure information. The countermeasure device generates countermeasure information representing a countermeasure against the abnormal state indicated by the log information by any of various existing methods. In the description of the present disclosure, the countermeasure information is also referred to as a countermeasure object. The effect information is information indicating a change in the state of the target device caused by the countermeasure information. The effect information may represent, for example, a change in the log information after the effect information is notified to the target device with respect to the log information before the effect information is notified to the target device. In the description of the present disclosure, the effect information is also referred to as an effect object. The effect information provision target may be a target person (e-mail address) included in a predetermined list of target persons (for example, a list of e-mail addresses). The effect information provision target may be, for example, a device included in a list of predetermined devices.

<Operation>

Figure 2:
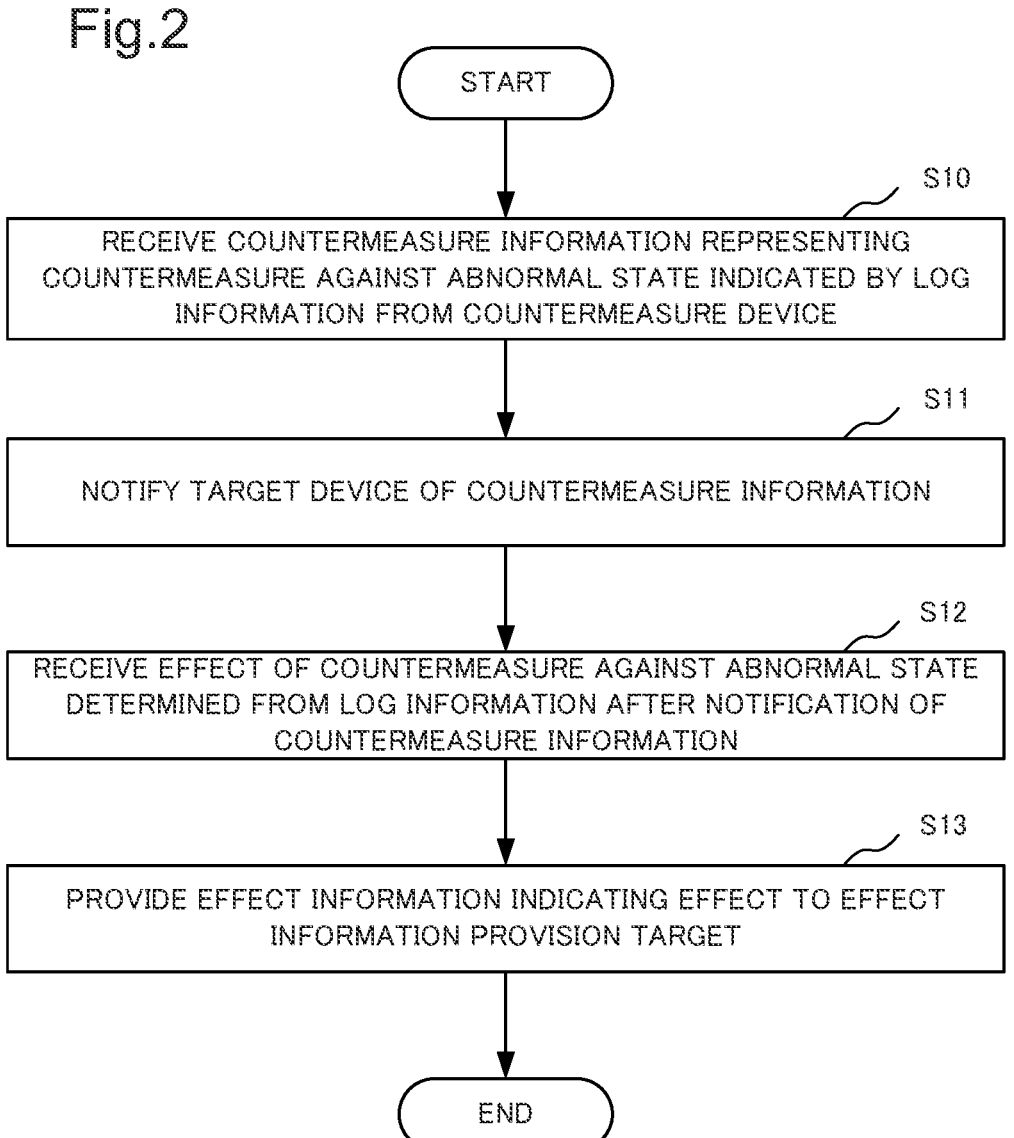
FIG. 2 is a flowchart illustrating an example of an operation of the sharing system according to the first example embodiment of the present disclosure.

FIG. 2 is a flowchart illustrating an example of an operation of the sharing system according to the first example embodiment of the present disclosure. In the example illustrated in FIG. 2, first, the countermeasure reception unit 121 receives countermeasure information representing a countermeasure against the abnormal state indicated by the log information and the like from the countermeasure device (Step S10). Next, the countermeasure notification unit 122 notifies the target device of the received countermeasure information (Step S11). The effect reception unit 131 receives, from the countermeasure device, the effect of the countermeasure against the abnormal state determined from the log information after notification of the countermeasure information (Step S12). The effect information provision unit 133 provides the effect information indicating the effect to the effect information provision target (Step S13).

Effects

The present disclosure has an effect that it is possible to improve the swiftness of disclosure and the ease of adjustment of the range of disclosure of information regarding security. The reason is that the effect information provision unit 133 provides the predetermined effect information provision target with the effect information representing the effect of the countermeasure against the abnormal state of the target device received from the countermeasure device by the effect reception unit 131. A predetermined effect information provision destination is a target person included in the list of predetermined target persons, a device included in the list of predetermined devices, or the like. The range of disclosure can be easily adjusted by appropriately determining the predetermined effect information provision destination.

Second Example Embodiment

Next, a sharing system according to a second example embodiment of the present disclosure will be described in detail with reference to the drawings.

<Configuration>

Figure 3:
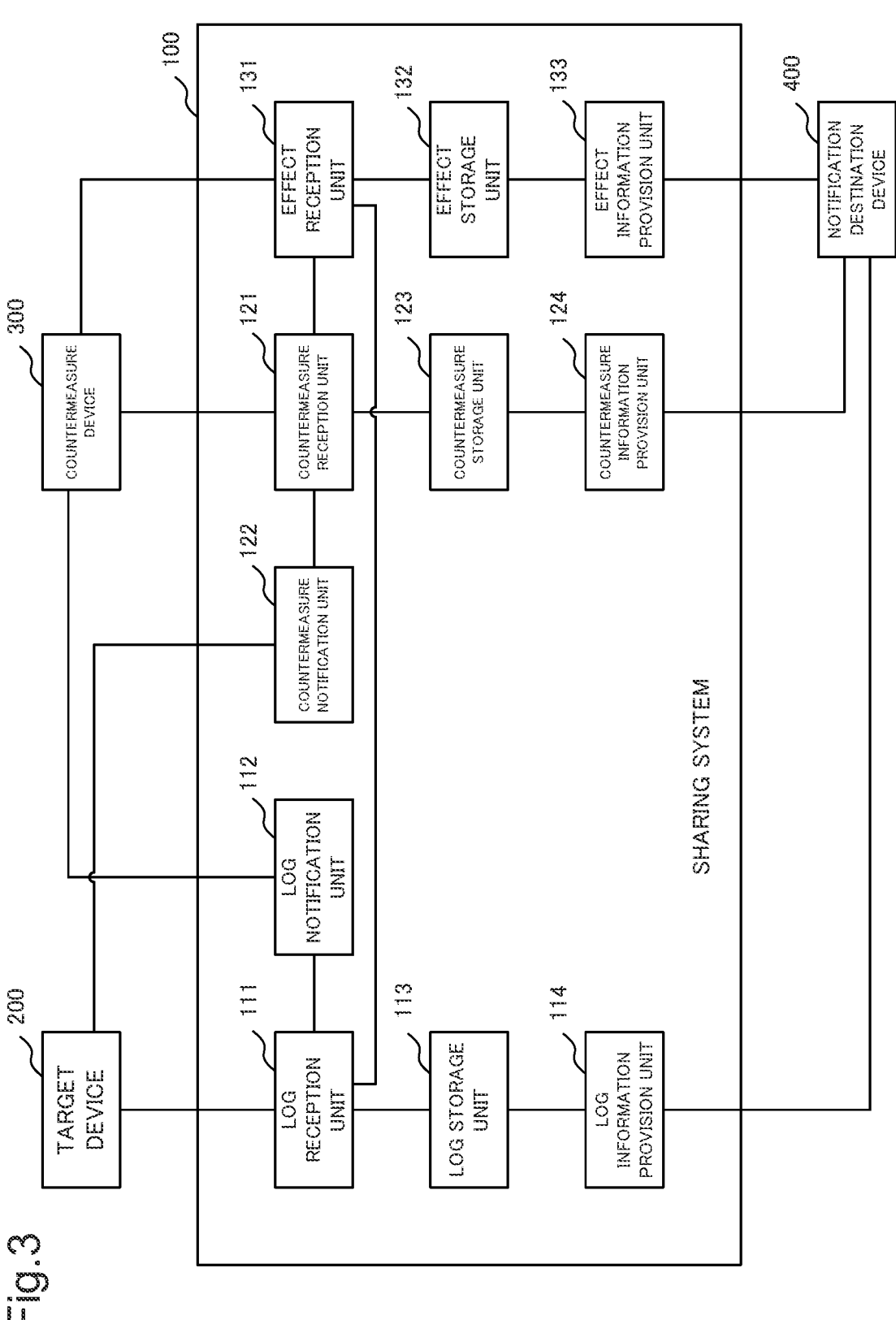
FIG. 3 is a block diagram illustrating an example of a configuration of a sharing system according to a second example embodiment of the present disclosure.

FIG. 3 is a block diagram illustrating an example of a configuration of the sharing system according to the second example embodiment of the present disclosure. In the example illustrated in FIG. 3, a sharing system 100 according to the present example embodiment includes a log reception unit 111, a log notification unit 112, a log storage unit 113, and a log information provision unit 114. The sharing system 100 according to the present example embodiment includes a countermeasure reception unit 121, a countermeasure notification unit 122, a countermeasure storage unit 123, and a countermeasure information provision unit 124. The sharing system 100 according to the present example embodiment includes an effect reception unit 131, an effect storage unit 132, and an effect information provision unit 133. The sharing system 100 is communicably connected to each of a target device 200, a countermeasure device 300, and a notification destination device 400.

<Target Device 200>

The target device 200 has the same function as the target device of the first example embodiment and performs the same operation as the operation of the target device of the first example embodiment. The target device 200 according to the present example embodiment adds log concealing period information representing a period (hereinafter, also referred to as log concealing period) during which the log information is concealed to the log information output from the target device 200. The target device 200 according to the present example embodiment outputs, for example, log information including log concealing period information. The target device 200 may set the log concealing period according to, for example, a rule for determining a predetermined log concealing period. The log concealing period may be indicated by a date and time when the log concealing period ends. In this case, the log concealing period information is information representing a date and time when the log concealing period ends.

<Countermeasure Device 300>

The countermeasure device 300 has the same function as the countermeasure device of the first example embodiment, and performs the same operation as the operation of the countermeasure device of the first example embodiment. Hereinafter, differences between the countermeasure device 300 of the present example embodiment and the countermeasure device of the first example embodiment will be mainly described.

The countermeasure device 300 according to the present example embodiment adds countermeasure concealing period information representing a period (hereinafter, also referred to as a countermeasure concealing period) during which the countermeasure information is concealed to the countermeasure information output from the countermeasure device 300. For example, the countermeasure device 300 of the present example embodiment outputs countermeasure information including countermeasure concealing period information. The countermeasure device 300 may set the countermeasure concealing period according to, for example, a rule for determining a predetermined countermeasure concealing period. The countermeasure concealing period may be represented by a date and time when the countermeasure concealing period ends. In this case, the countermeasure concealing period information may be a date and time when the countermeasure concealing period ends.

The countermeasure device 300 adds an identifier (hereinafter, referred to as a countermeasure information identifier) to the countermeasure information representing the countermeasure against the abnormal state represented by the received log information. The countermeasure device 300 adds the log information identifier of the received log information and the countermeasure information identifier of the countermeasure information representing the countermeasure against the abnormal state represented by the log information to the countermeasure information. In other words, the countermeasure device 300 generates countermeasure information representing a countermeasure against the abnormal state represented by the received log information and including the log information identifier of the log information and the countermeasure information identifier. Then, the countermeasure device 300 transmits the generated countermeasure information to the countermeasure reception unit 121.

The countermeasure device 300 receives the log information after transmitting the countermeasure information indicating the countermeasure against the abnormal state represented by the received log information. The log information received after transmitting the countermeasure information indicating the countermeasure against the abnormal state represented by the received log information is referred to as post-countermeasure log information. The countermeasure device 300 determines the degree of reduction in the abnormal state in which the countermeasure is generated in the state indicated by the post-countermeasure log information received after transmitting the countermeasure information indicating the countermeasure.

When the determined degree of reduction does not satisfy a first criterion (hereinafter, it is referred to as a validity criterion), the countermeasure device 300 determines that the countermeasure indicated by the generated countermeasure information is not valid. In this case, the countermeasure device 300 may add, to the invalid countermeasure information, countermeasure information indicating the countermeasure determined not to be valid. The invalid countermeasure information indicates countermeasure information indicating a countermeasure determined not to be valid for the abnormal state indicated by the log information. The invalid countermeasure information may be represented by, for example, a combination of a log information identifier of log information indicating an abnormal state and a countermeasure information identifier of the countermeasure information determined not to be valid for the abnormal state. Then, the countermeasure device 300 generates countermeasure information representing another countermeasure against the abnormal state indicated by the log information, and transmits the generated countermeasure information to the countermeasure reception unit 121.

When the determined degree of reduction satisfies the first criterion (that is, validity criterion), the countermeasure device 300 determines that the countermeasure indicated by the previously-transmitted countermeasure information is valid. The countermeasure device 300 adds countermeasure information indicating the countermeasure determined to be valid to the valid countermeasure information. The valid countermeasure information indicates countermeasure information indicating the countermeasure determined to be valid for the abnormal state represented by the log information. The valid countermeasure information may be represented by, for example, a combination of a log information identifier of log information indicating an abnormal state and a countermeasure information identifier of countermeasure information determined to be valid for the abnormal state. The valid countermeasure information may be represented by a combination of the log information identifier of the log information indicating the abnormal state, the countermeasure information identifier of the countermeasure information determined to be valid for the abnormal state, and the degree of reduction of the abnormal state by the countermeasure information.

In a case where the determined degree of reduction does not satisfy a second criterion (hereinafter, it is referred to as an abnormality elimination criterion), the countermeasure device 300 determines that the post-countermeasure log information also indicates the abnormal state, that is, the abnormal state has not been eliminated. In this case, the countermeasure device 300 generates the countermeasure information indicating the countermeasure against the abnormal state indicated by the post-countermeasure log information, and transmits the generated countermeasure information to the countermeasure reception unit 121. The countermeasure information generated in this case may further include a log information identifier of the post-countermeasure log information.

As described above, when receiving the log information indicating the abnormal state, the countermeasure device 300 repeats generation and transmission of the countermeasure information indicating the countermeasure against the abnormal state and determination of the degree of reduction of the abnormal state until the degree of reduction determined using the post-countermeasure log information satisfies the abnormality elimination criterion.

When the determined degree of reduction satisfies the abnormality elimination criterion, the countermeasure device 300 transmits the valid countermeasure information and the information representing the degree of reduction (hereinafter, referred to as effect information) to the effect reception unit 131. The countermeasure device 300 may set the effect concealing period representing the period during which the effect information is concealed, for example, according to a predetermined rule for setting the effect concealing period, and generate the effect information including the effect concealing period information representing the effect concealing period. The effect concealing period may be represented by a date and time when the effect concealing period ends. In this case, the effect concealing period information is information indicating the date and time when the effect concealing period ends.

<Notification Destination Device 400>

The notification destination device 400 corresponds to the effect information provision target of the first example embodiment. For example, in a case where the effect information provision target is a device, the notification destination device 400 is the effect information provision target. In a case where the effect information provision target is represented by an e-mail address, the notification destination device 400 is a device that receives an e-mail addressed to the e-mail address that is the effect information provision target.

<Log Reception Unit 111>

The log reception unit 111 receives, from the target device 200, the log information representing the security state of the target device 200. The log information of the present example embodiment includes the same information as the log information of the first example embodiment. In the present example embodiment, the log concealing period information representing the period during which the log information is concealed is added to the log information transmitted from the target device 200. The log information may include the log concealing period information. The log reception unit 111 may add an identifier (hereinafter, referred to as a log information identifier) to the received log information. The log concealing period information is determined by the target device 200. The log reception unit 111 transmits the log information to the log notification unit 112. The log reception unit 111 stores the log information in the log storage unit 113. The log reception unit 111 may transmit the log information identifier of the received log information to the countermeasure reception unit 121.

<Log Notification Unit 112>

The log notification unit 112 receives the log information from the log reception unit 111. The log notification unit 112 notifies the countermeasure device 300 of the received log information. In other words, the log notification unit 112 transmits the received log information to the countermeasure device 300.

<Log Storage Unit 113>

The log information stored by the log storage unit 113 is stored.

<Countermeasure Reception Unit 121>

The countermeasure reception unit 121 receives, from the countermeasure device 300, the countermeasure information indicating the countermeasure against the abnormal state in a case where the log information indicates an abnormal state. The countermeasure reception unit 121 transmits the received countermeasure information to the countermeasure notification unit 122. The countermeasure reception unit 121 stores the received countermeasure information in the countermeasure storage unit 123.

<Countermeasure Notification Unit 122>

The countermeasure notification unit 122 receives the countermeasure information from the countermeasure reception unit 121. The countermeasure notification unit 122 notifies the target device of the received countermeasure information. In other words, the countermeasure notification unit 122 transmits the received countermeasure information to the target device.

<Countermeasure Storage Unit 123>

The countermeasure storage unit 123 stores the countermeasure information stored by the countermeasure reception unit 121.

<Effect Reception Unit 131>

The effect reception unit 131 receives, from the countermeasure device 300, the above-described effect information indicating the effect of the countermeasure against the abnormal state indicated by the log information.

As described above, the effect information includes the log information identifier of the log information indicating the abnormal state and the countermeasure information identifier of the countermeasure information indicating the countermeasure against the abnormal state. The effect reception unit 131 generates, from the log information identifier, log information reference destination information indicating a reference destination of the log information indicated by the log information identifier. The reference destination of the log information indicated by the log information identifier is information for reading the log information specified by the log information identifier. The reference destination of the log information may represent a request, a command, a uniform resource identifier (URI), or the like for reading the log information. When the log reference destination information includes the information on a storage destination of the log information in the log storage unit 113, the effect reception unit 131 may acquire the information on the storage destination of the log information from the log reception unit 111. The effect reception unit 131 generates, from the effect information identifier, effect information reference destination information indicating the reference destination of the effect information indicated by the effect information identifier. The reference destination of the effect information indicated by the effect information identifier is information for reading the effect information specified by the effect information identifier. The reference destination of the effect information may represent a request, a command, a URI, or the like for reading the effect information. When the effect reference destination information includes information on the storage destination of the effect information in the effect storage unit 132, the effect reception unit 131 may acquire the information on the storage destination of the effect information from the countermeasure reception unit 121.

The effect reception unit 131 adds the generated log information reference destination information and effect information reference destination information to the received effect information. The effect reception unit 131 stores the effect information to which the log information reference destination information and the effect information reference destination information are added in the effect storage unit 132. The effect reception unit 131 may store, for example, the effect information including the log information reference destination information and the effect information reference destination information in the effect storage unit 132.

<Effect Storage Unit 132>

The effect storage unit 132 stores the effect information.

<Effect Information Provision Unit 133>

The effect information provision unit 133 provides the effect information stored in the effect storage unit 132 to a predetermined effect information provision target. In a case where the effect information stored in the effect storage unit 132 includes the effect concealing period information, the effect information provision unit 133 may provide the effect information to a predetermined effect information provision target in a case where the concealing period indicated by the information effect concealing period information has elapsed.

The effect information provision unit 133 may transmit a list of effect information that can be provided among the effect information stored in the effect storage unit 132 to the notification destination device 400. The list of the effect information in this case may be, for example, a list of effect reference destination information that is information indicating a reference destination of the effect information. The reference destination of the effect information may represent a request, a command, a uniform resource identifier (URI), or the like for reading the effect information. Then, the effect information provision unit 133 may receive a request for effect information using, for example, the effect reference destination information from the notification destination device 400, and transmit the effect information requested by the received request to the notification destination device 400.

<Log Information Provision Unit 114>

The log information provision unit 114 receives the request for the log information indicated by the log information reference destination information from the notification destination device 400. When the date and time when the request for log information is received is not within the log information concealing period of the log information indicated by the log information reference destination information, the log information provision unit 114 provides the log information indicated by the log information reference destination information to the notification destination device 400. In other words, in a case where the date and time when the request for log information is received is later than the date and time when the log information concealing period of the log information indicated by the log information reference destination information ends, the log information provision unit 114 provides the log information indicated by the log information reference destination information to the notification destination device 400. When the date and time when the request for log information is received is within the log information concealing period of the log information indicated by the log information reference destination information, the log information provision unit 114 does not provide the log information indicated by the log information reference destination information to the notification destination device 400. In other words, when the date and time when the request for log information is received is before the date and time when the log information concealing period of the log information indicated by the log information reference destination information ends, the log information provision unit 114 does not provide the log information indicated by the log information reference destination information to the notification destination device 400.

<Countermeasure Information Provision Unit 124>

The countermeasure information provision unit 124 receives a request for countermeasure information indicated by the countermeasure information reference destination information from the notification destination device 400. In a case where the date and time when the request for the countermeasure information has been received is not within the countermeasure information concealing period of the countermeasure information indicated by the countermeasure information reference destination information, the countermeasure information provision unit 124 provides the countermeasure information indicated by the countermeasure information reference destination information to the notification destination device 400. In other words, in a case where the date and time when the request for the countermeasure information is received is later than the date and time when the countermeasure information concealing period of the countermeasure information indicated by the countermeasure information reference destination information ends, the countermeasure information provision unit 124 provides the countermeasure information indicated by the countermeasure information reference destination information to the notification destination device 400. In a case where the date and time when the request for the countermeasure information has been received is within the countermeasure information concealing period of the countermeasure information indicated by the countermeasure information reference destination information, the countermeasure information provision unit 124 does not provide the countermeasure information indicated by the countermeasure information reference destination information to the notification destination device 400. In other words, in a case where the date and time when the request for the countermeasure information is received is on or before the date and time when the countermeasure information concealing period of the countermeasure information indicated by the countermeasure information reference destination information ends, the countermeasure information provision unit 124 does not provide the countermeasure information indicated by the countermeasure information reference destination information to the notification destination device 400.

<Notification Destination Device 400>

For example, the notification destination device 400 may receive a list of providable effect information from the effect information provision unit 133 and transmit the request for the effect information included in the received list to the effect information provision unit 133.

The notification destination device 400 receives the effect information from the effect information provision unit 133 and displays the received effect information. In accordance with an instruction from the user of the notification destination device 400, the notification destination device 400 transmits the request for log information indicated by the log information reference destination information to the log information provision unit 114 of the sharing system 100 by using the log information reference destination information included in the received effect information. When receiving the log information from the log information provision unit 114 of the sharing system 100, the notification destination device 400 displays the received log information. In accordance with an instruction from the user of the notification destination device 400, the notification destination device 400 transmits the request for the countermeasure information indicated by the countermeasure information reference destination information to the countermeasure information provision unit 124 of the sharing system 100 by using the countermeasure information reference destination information included in the received effect information. When receiving the countermeasure information from the countermeasure information provision unit 124 of the sharing system 100, the notification destination device 400 displays the received countermeasure information.

<Operation>

Next, an operation of the sharing system according to the second example embodiment of the present disclosure will be described in detail with reference to the drawings.

Figure 4:
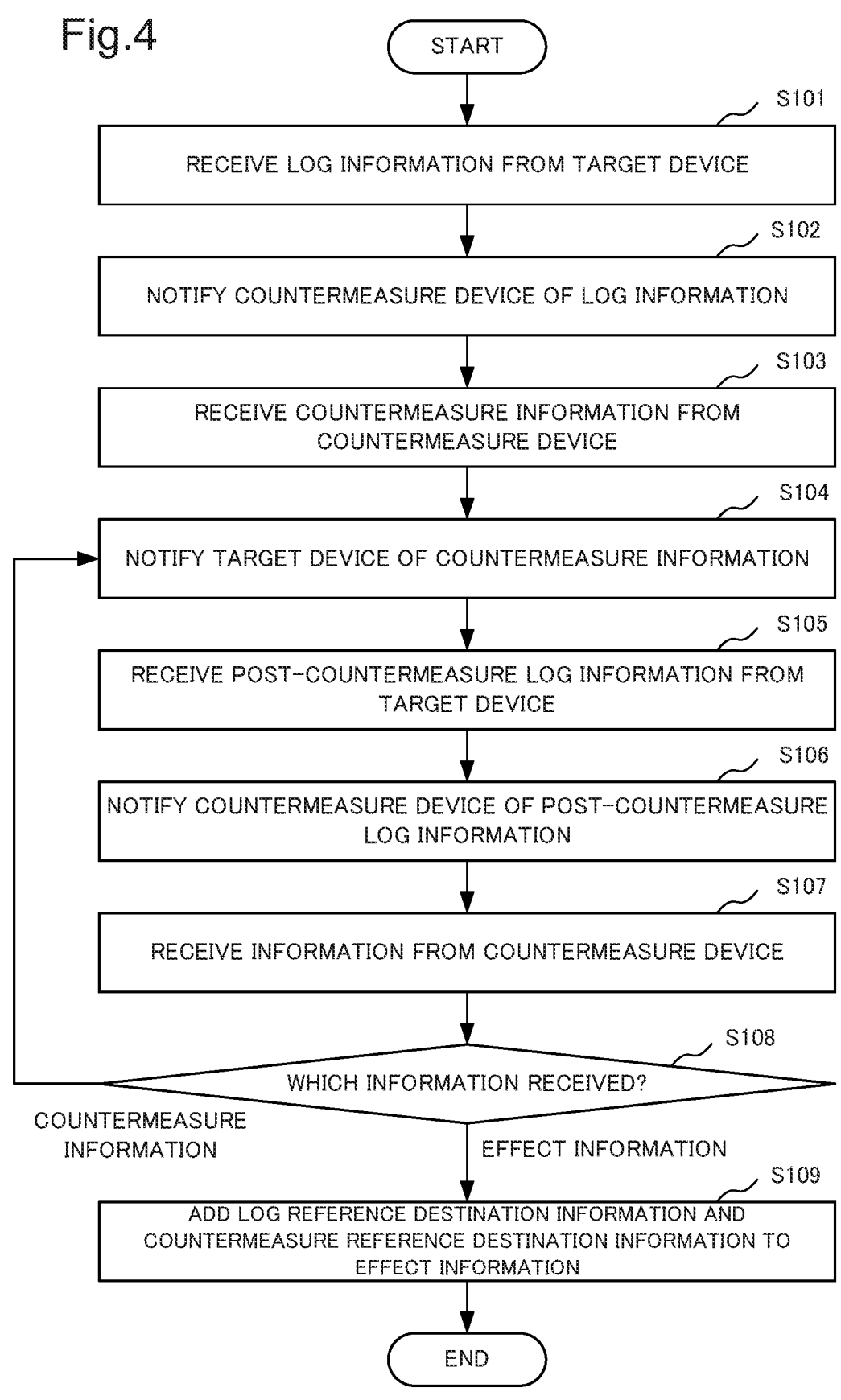
FIG. 4 is a flowchart illustrating an example of an operation of the sharing system according to the second example embodiment of the present disclosure.

FIG. 4 is a flowchart illustrating an example of the operation of the sharing system according to the second example embodiment of the present disclosure. The operation illustrated in FIG. 4 is an operation of receiving the log information, the countermeasure information, and the effect information. In the example illustrated in FIG. 4, first, the log reception unit 111 receives the log information from the target device 200 (Step S101). Next, the log notification unit 112 notifies the countermeasure device 300 of the log information (Step S102). Next, the countermeasure reception unit 121 receives the countermeasure information from the countermeasure device 300 (Step S103). The countermeasure notification unit 122 notifies the target device 200 of the countermeasure information (step 104). Then, the log reception unit 111 receives the post-countermeasure log information from the target device 200 (Step S105). The log notification unit 112 notifies the countermeasure device 300 of the post-countermeasure log information (Step S106).

Then, the sharing system 100 receives information (countermeasure information or effect information) from the countermeasure device 300 (Step S107). The countermeasure device 300 uses the received post-countermeasure log information to determine whether the abnormal state indicated by the log information has been eliminated by the countermeasure indicated by the countermeasure information. When determining that the abnormal state indicated by the log information has been eliminated by the countermeasure indicated by the countermeasure information, the countermeasure device 300 transmits, to the effect reception unit 131, effect information indicating the effect of the countermeasure indicated by the countermeasure information on the abnormal state indicated by the log information. In this case, in Step S107, the effect reception unit 131 receives the effect information. When determining that the abnormal state indicated by the log information has not been eliminated by the countermeasure indicated by the countermeasure information, the countermeasure device 300 transmits countermeasure information indicating another countermeasure against the abnormal state indicated by the log information to the countermeasure reception unit 121. In this case, in Step S107, the countermeasure reception unit 121 receives the countermeasure information.

When the countermeasure reception unit 121 receives the countermeasure information ("countermeasure information" in Step S108), the operation of the sharing system 100 returns to Step S104. When the effect reception unit 131 receives the effect information ("effect information" in Step S108), the operation of the sharing system 100 proceeds to Step S109.

In Step S109, the effect reception unit 131 adds the log reference destination information and the countermeasure reference destination information to the effect information. Then, the effect reception unit 131 stores the effect information (for example, effect information including log reference destination information and countermeasure reference destination information) to which the log reference destination information and the countermeasure reference destination information are added in the effect storage unit 132. Then, the sharing system 100 ends the operation illustrated in FIG. 4.

Figure 5:
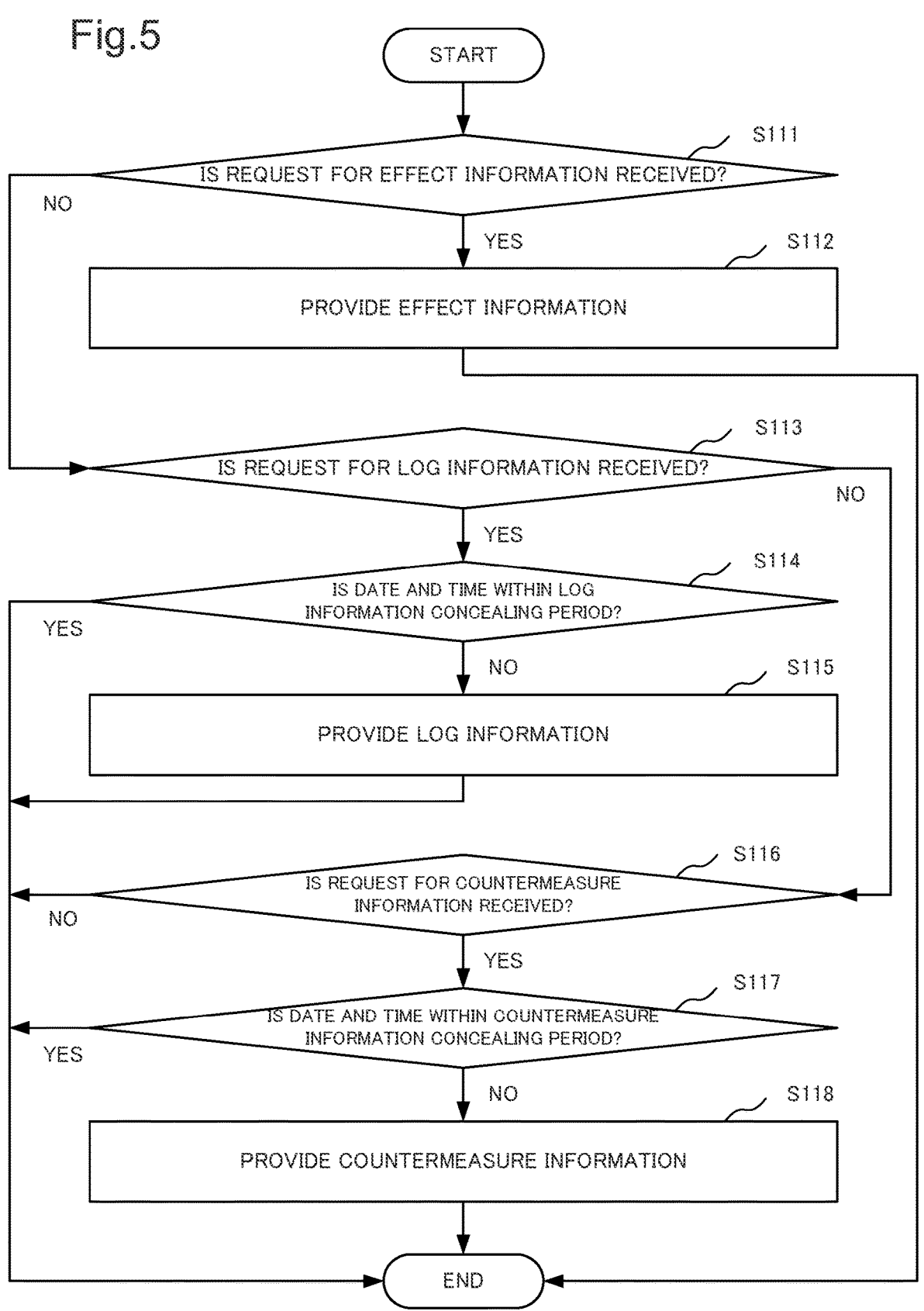
FIG. 5 is a flowchart illustrating an example of the operation of the sharing system according to the second example embodiment of the present disclosure.

FIG. 5 is a flowchart illustrating an example of an operation of the sharing system 100 according to the second example embodiment of the present disclosure. FIG. 5 illustrates an operation of providing the effect information, the log information, or the effect information. The sharing system 100 starts the operation illustrated in FIG. 5 when receiving a request for information (that is, the effect information, the log information, or the effect information).

In the example of the operation illustrated in FIG. 5, when the effect information provision unit 133 receives the request for effect information (YES in Step S111), the effect information provision unit 133 provides the effect information (Step S112). Then, the sharing system 100 ends the operation illustrated in FIG. 5.

When the effect information provision unit 133 has not received the request for the effect information (NO in Step S11*l*), the sharing system 100 executes the operation from Step S113. In this case, when the log information provision unit 114 receives the request for the log information (YES in Step S113), the log information provision unit 114 specifies the log information concealing period of the log information for which the request has been received. Then, the log information provision unit 114 determines whether the date and time when the request for log information is received is within the log information concealing period of the log information. When the date and time when the log information is received is not within the log information concealing period of the log information (NO in Step S114), the log information provision unit 114 provides the log information to the notification destination device 400 (Step S115). Then, the sharing system 100 ends the operation illustrated in FIG. 5. When the date and time when the log information is received is within the log information concealing period of the log information (YES in Step S114), the sharing system 100 ends the operation illustrated in FIG. 5.

In Step S113, when the log information provision unit 114 has not received the request for the log information (NO in Step S113), the sharing system 100 performs the operations in and after Step S116. When the countermeasure information provision unit 124 has received the request for the countermeasure information (YES in Step S116), the countermeasure information provision unit 124 specifies the countermeasure information concealing period of the countermeasure information for which the request has been received. Then, the countermeasure information provision unit 124 determines whether the date and time when the request for the countermeasure information is received is within the countermeasure information concealing period of the countermeasure information. When the date and time when the countermeasure information has been received is not within the countermeasure information concealing period of the countermeasure information (NO in Step S117), the countermeasure information provision unit 124 provides the countermeasure information to the notification destination device 400 (Step S118). Then, the sharing system 100 ends the operation illustrated in FIG. 5. When the date and time when the countermeasure information has been received is within the countermeasure information concealing period of the countermeasure information (YES in Step S117), the sharing system 100 ends the operation illustrated in FIG. 5.

In Step S116, when the countermeasure information provision unit 124 has not received the request for the countermeasure information (NO in Step S116), the sharing system 100 ends the operation illustrated in FIG. 5.

Effects

The present example embodiment described above has the same effect as the effect of the first example embodiment. The reason is the same as the reason why the effect of the first example embodiment occurs.

Third Example Embodiment

Next, a third example embodiment of the present disclosure will be described in detail with reference to the drawings.

<Configuration>

Figure 6:
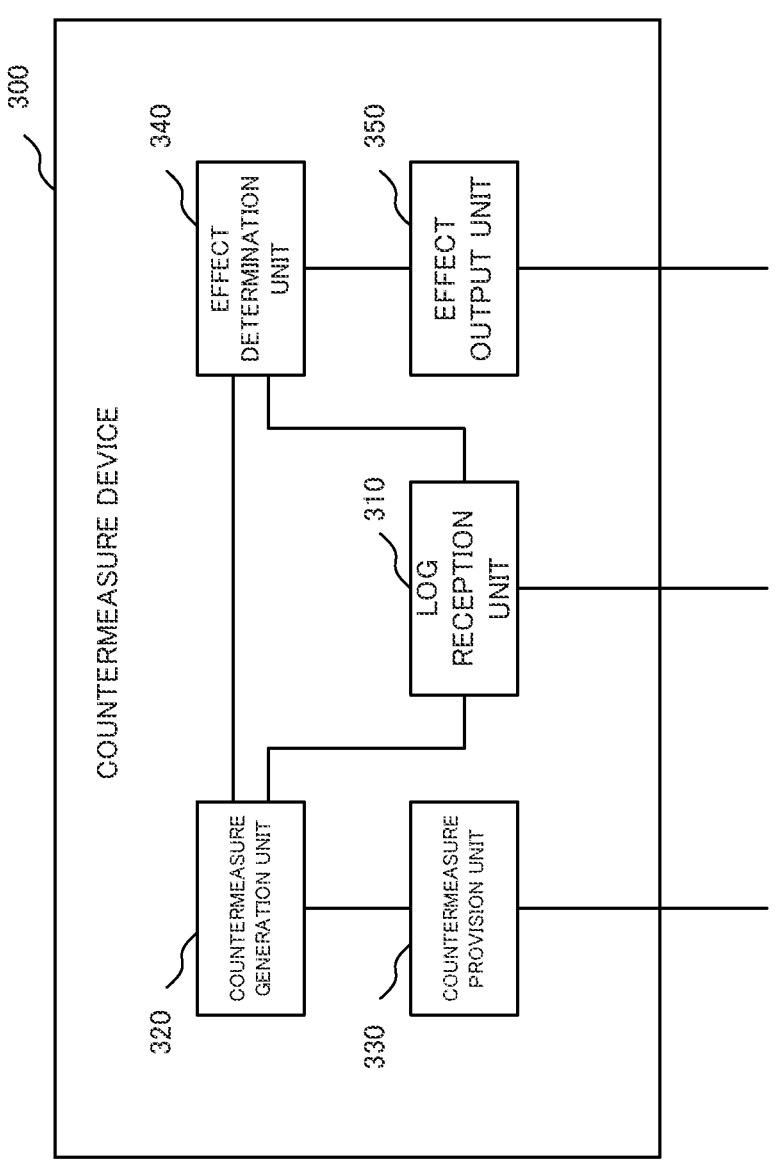
FIG. 6 is a block diagram illustrating an example of a configuration of a countermeasure device according to a third example embodiment of the present disclosure.

FIG. 6 is a block diagram illustrating an example of a configuration of a countermeasure device according to a third example embodiment of the present disclosure. In the example illustrated in FIG. 6, a countermeasure device 300 according to the present example embodiment includes a log reception unit 310, a countermeasure generation unit 320, a countermeasure provision unit 330, an effect determination unit 340, and an effect output unit 350. The log reception unit 310 receives the log information indicating the security state output from the target device. When the log information indicates the abnormal state, the countermeasure generation unit 320 generates countermeasure information indicating the countermeasure against the abnormal state. The countermeasure provision unit 330 provides the countermeasure information. The effect determination unit 340 determines an effect of the countermeasure from post-countermeasure log information that is log information received after the countermeasure information is provided. The effect output unit 350 outputs effect information indicating the effect. The countermeasure device 300 of the present example embodiment has the same function as the countermeasure device 300 of the second example embodiment, and performs the same operation as the operation of the countermeasure device 300 of the second example embodiment.

<Supplement>

In the present example embodiment, for example, the countermeasure provision unit 330 adds countermeasure concealing period information representing a period (hereinafter, also referred to as a countermeasure concealing period) during which the countermeasure information is concealed to the countermeasure information generated by the countermeasure provision unit 330. For example, the countermeasure provision unit 330 outputs the countermeasure information including the countermeasure concealing period information. The countermeasure provision unit 330 may set the countermeasure concealing period according to, for example, a rule for determining a predetermined countermeasure concealing period. The countermeasure concealing period is the same as the countermeasure concealing period of the second example embodiment.

For example, the countermeasure generation unit 320 adds an identifier (hereinafter, referred to as a countermeasure information identifier) to the countermeasure information representing the countermeasure against the abnormal state indicated by the log information received by the log reception unit 310. The countermeasure generation unit 320 adds the log information identifier of the received log information and the countermeasure information identifier of the countermeasure information representing the countermeasure against the abnormal state indicated by the log information to the countermeasure information. In other words, the countermeasure generation unit 320 generates the countermeasure information representing the countermeasure against the abnormal state represented by the received log information and including the log information identifier of the log information and the countermeasure information identifier. Then, the countermeasure provision unit 330 transmits the generated information to the countermeasure reception unit 121.

The log reception unit 310 receives the log information after transmitting the countermeasure information indicating the countermeasure against the abnormal state represented by the received log information. The log information received after transmitting the countermeasure information indicating the countermeasure against the abnormal state represented by the received log information is referred to as post-countermeasure log information. The effect determination unit 340 determines the degree of reduction in the abnormal state in which the countermeasure is generated in the state indicated by the post-countermeasure log information received after transmitting the countermeasure information indicating the countermeasure.

When the determined degree of reduction does not satisfy the first criterion (hereinafter, it is referred to as a validity criterion), the effect determination unit 340 determines that the countermeasure indicated by the generated countermeasure information is not valid. In this case, the effect determination unit 340 may add, to the invalid countermeasure information, the countermeasure information indicating the countermeasure determined not to be valid. As described above, the invalid countermeasure information represents the countermeasure information indicating the countermeasure determined not to be valid for the abnormal state indicated by the log information. The invalid countermeasure information may be represented by, for example, a combination of a log information identifier of log information indicating an abnormal state and a countermeasure information identifier of the countermeasure information determined not to be valid for the abnormal state. Then, the effect output unit 350 generates countermeasure information representing another countermeasure against the abnormal state indicated by the log information, and transmits the generated countermeasure information to the countermeasure reception unit 121.

When the determined degree of reduction satisfies the first criterion (that is, validity criterion), the effect determination unit 340 determines that the countermeasure indicated by previously transmitted countermeasure information is valid. The effect determination unit 340 adds the countermeasure information indicating the countermeasure determined to be valid to the valid countermeasure information. As described above, the valid countermeasure information represents the countermeasure information indicating the countermeasure determined to be valid for the abnormal state indicated by the log information. The valid countermeasure information may be represented by, for example, a combination of a log information identifier of log information indicating an abnormal state and a countermeasure information identifier of countermeasure information determined to be valid for the abnormal state. The valid countermeasure information may be represented by a combination of the log information identifier of the log information indicating the abnormal state, the countermeasure information identifier of the countermeasure information determined to be valid for the abnormal state, and the degree of reduction of the abnormal state by the countermeasure information.

When the determined degree of reduction does not satisfy the second criterion (hereinafter, it is referred to as an abnormality elimination criterion), the effect determination unit 340 determines that the post-countermeasure log information also indicates an abnormal state, that is, the abnormal state has not been eliminated. In this case, the countermeasure generation unit 320 generates the countermeasure information indicating a countermeasure against the abnormal state indicated by the post-countermeasure log information. Then, the countermeasure provision unit 330 transmits the generated countermeasure information to the countermeasure reception unit 121. The countermeasure information generated in this case may further include a log information identifier of the post-countermeasure log information.

As described above, when receiving the log information indicating the abnormal state, the countermeasure device 300 repeats generation and transmission of the countermeasure information indicating the countermeasure against the abnormal state and determination of the degree of reduction of the abnormal state until the degree of reduction determined using the post-countermeasure log information satisfies the abnormality elimination criterion.

When the degree of reduction determined by the effect determination unit 340 satisfies the abnormality elimination criterion, the effect output unit 350 transmits the valid countermeasure information and the information indicating the degree of reduction (hereinafter, referred to as effect information) to the effect reception unit 131. The effect output unit 350 may set the effect concealing period representing the period during which the effect information is concealed, for example, according to a predetermined rule for setting the effect concealing period, and generate the effect information including the effect concealing period information representing the effect concealing period. The effect concealing period may be represented by a date and time when the effect concealing period ends. In this case, the effect concealing period information is information indicating the date and time when the effect concealing period ends.
<Operation>

Next, the operation of the countermeasure device according to the third example embodiment of the present disclosure will be described in detail with reference to the drawings.

Figure 7:
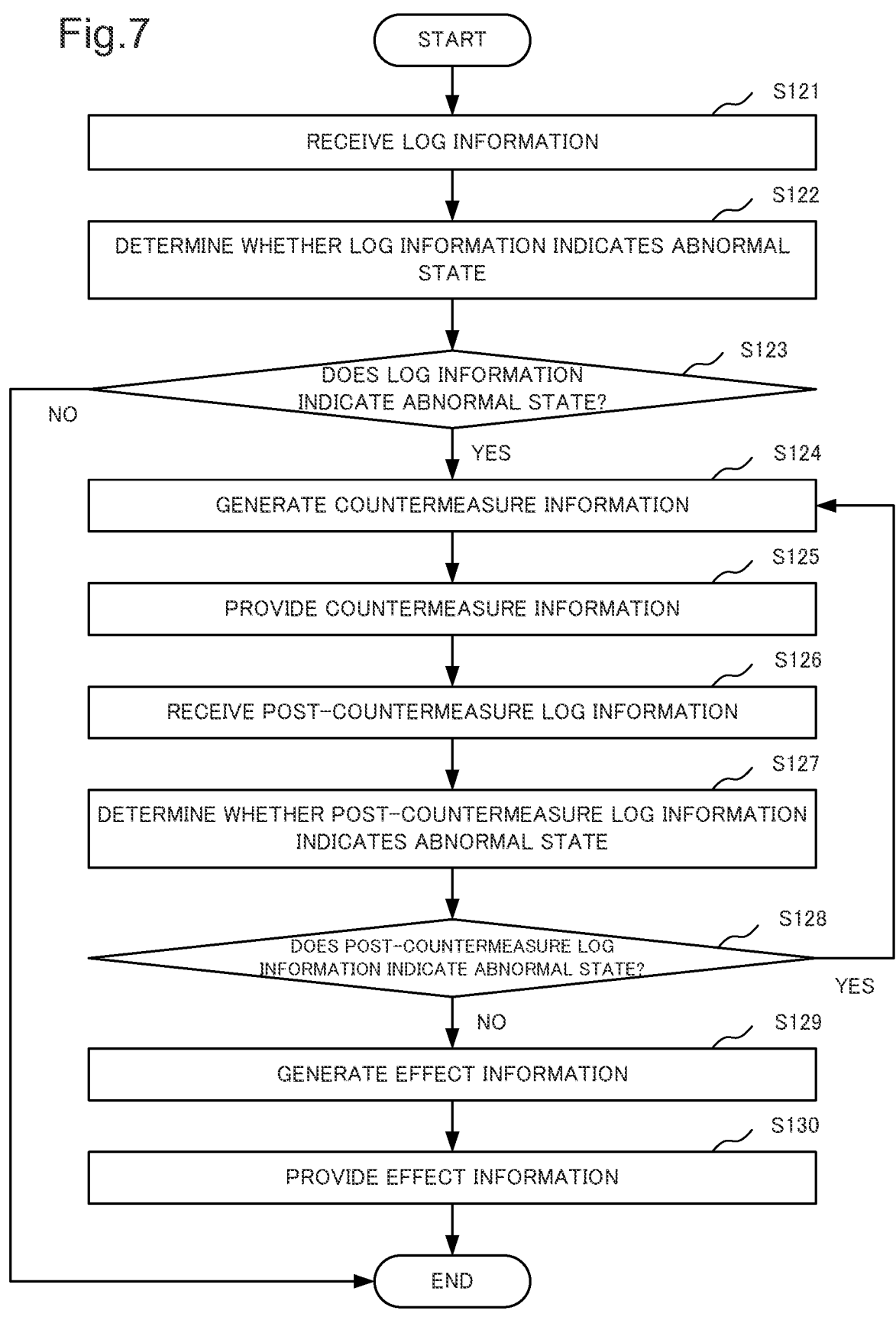
FIG. 7 is a flowchart illustrating an example of an operation of the countermeasure device according to the third example embodiment of the present disclosure.

FIG. 7 is a flowchart illustrating an example of an operation of the countermeasure device according to the third example embodiment of the present disclosure. In the example illustrated in FIG. 7, first, the log reception unit 310 receives the log information (Step S121). Next, the countermeasure generation unit 320 determines whether the log information indicates the abnormal state (Step S122). When the log information does not indicate the abnormal state (NO in Step S123), the countermeasure device 300 ends the operation illustrated in FIG. 7.

When the log information indicates the abnormal state (YES in Step S123), the countermeasure generation unit 320 generates the countermeasure information (Step S124). Then, the countermeasure provision unit 330 provides the countermeasure information to the countermeasure reception unit 121 of the sharing system 100 (Step S125).

Next, the log reception unit 310 receives the post-countermeasure log information (Step S126). Then, the effect determination unit 340 determines whether the post-countermeasure log information indicates the abnormal state (Step S127). In Step S127, in addition to determining whether the post-countermeasure log information indicates the abnormal state, the effect determination unit 340 may determine the effect of the countermeasure indicated by the provided countermeasure information.

When the post-countermeasure log information indicates the abnormal state (YES in Step S128), the operation of the countermeasure device 300 returns to Step S124. When the post-countermeasure log information does not indicate the abnormal state (NO in Step S128), the effect determination unit 340 generates the effect information (Step S129). Then, the effect output unit 350 provides the effect information to the effect reception unit 131 (Step S130).

Other Example Embodiments

Each of the sharing system 10, the sharing system 100, and the countermeasure device 300 can be achieved by a computer including a memory in which a program read from a storage medium is loaded and a processor that executes the program. Each of the sharing system 10, the sharing system 100, and the countermeasure device 300 can also be achieved by dedicated hardware such as a circuit. Each of the sharing system 10, the sharing system 100, and the countermeasure device 300 can also be achieved by a combination of the above-described computer and dedicated hardware.

Figure 8:
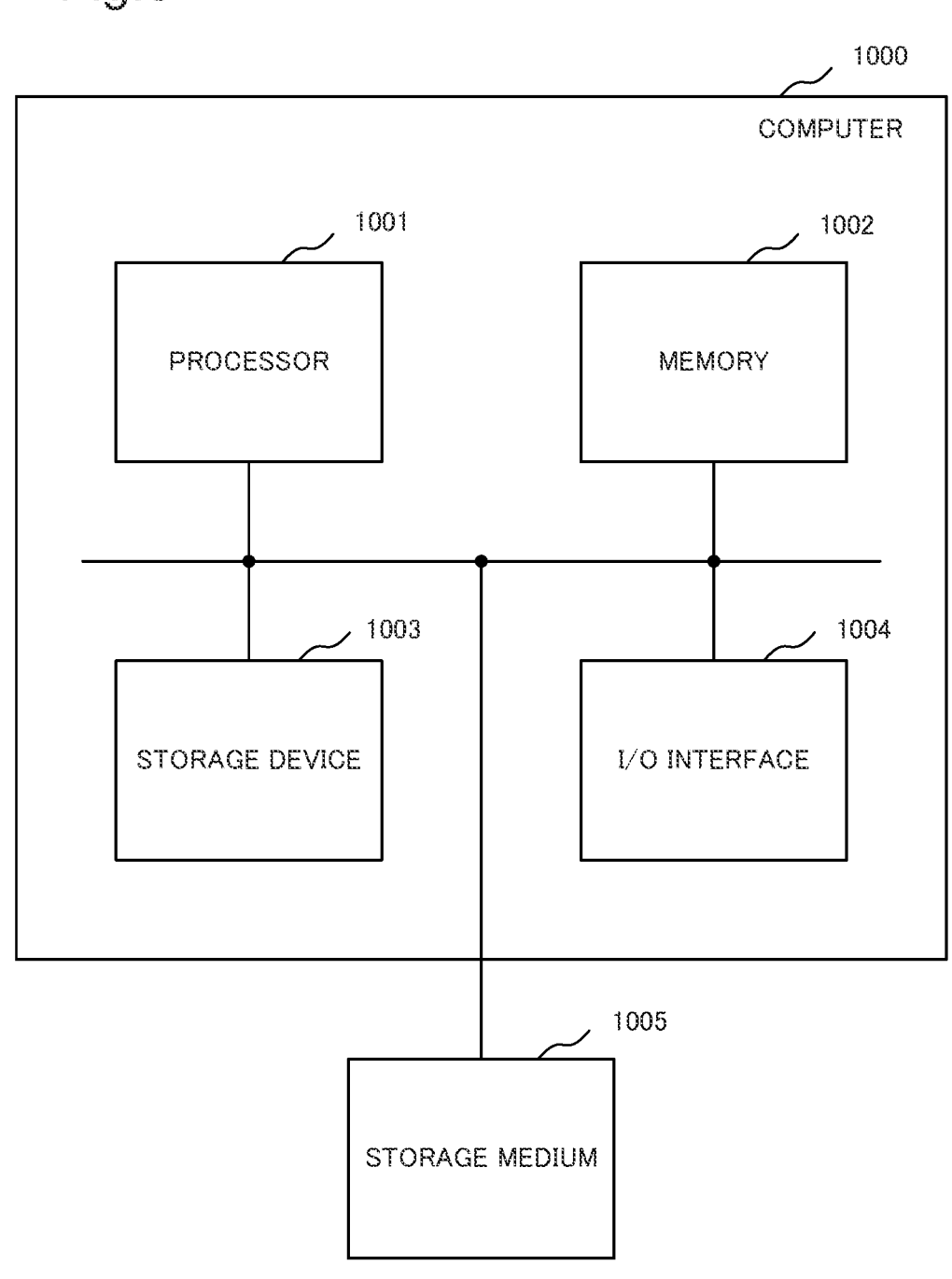
FIG. 8 is a diagram illustrating an example of a hardware configuration of a computer that can achieve the sharing system and the countermeasure device according to an example embodiment of the present disclosure.

FIG. 8 is a diagram illustrating an example of a hardware configuration of a computer 1000 that can achieve the sharing system and the countermeasure device according to the example embodiment of the present disclosure. Referring to FIG. 8, the computer 1000 includes a processor 1001, a memory 1002, a storage device 1003, and an I/O (Input/Output) interface 1004. The computer 1000 can access the storage medium 1005. The memory 1002 and the storage device 1003 are, for example, storage devices such as a random access memory (RAM) and a hard disk. The storage medium 1005 is, for example, a storage device such as a RAM or a hard disk, a read only memory (ROM), or a portable storage medium. The storage device 1003 may be the storage medium 1005. The processor 1001 can read and write data and programs from and in the memory 1002 and the storage device 1003. The processor 1001 can access, for example, other devices via the I/O interface 1004. The processor 1001 may access the storage medium 1005. The storage medium 1005 stores a program for operating the computer 1000 as the sharing system 10, a program for operating the computer 1000 as the sharing system 100, or a program for operating the computer 1000 as the countermeasure device 300.

The processor 1001 loads a program, which is stored in the storage medium 1005 and causes the computer 1000 to operate as the sharing system 10, into the memory 1002. Then, the processor 1001 executes the program loaded in the memory 1002, whereby the computer 1000 operates as the sharing system 10.

The processor 1001 loads a program, which is stored in the storage medium 1005 and causes the computer 1000 to operate as the sharing system 100, into the memory 1002.

Then, the processor 1001 executes the program loaded in the memory 1002, whereby the computer 1000 operates as the sharing system 100.

The processor 1001 loads, into the memory 1002, a program that is stored in the storage medium 1005 and causes the computer 1000 to operate as the countermeasure device 300. Then, when the processor 1001 executes the program loaded in the memory 1002, the computer 1000 operates as the countermeasure device 300.

The log reception unit 111, the log notification unit 112, the log information provision unit 114, the countermeasure reception unit 121, the countermeasure notification unit 122, the countermeasure information provision unit 124, the effect reception unit, and the effect information provision unit 133 can be achieved by, for example, the processor 1001 that executes a program loaded in the memory 1002. The log storage unit 113, the countermeasure storage unit 123, and the effect storage unit 132 can be achieved by the memory 1002 included in the computer 1000 or the storage device 1003 such as a hard disk device. Some or all of the log reception unit 111, the log notification unit 112, the log information provision unit 114, the countermeasure reception unit 121, the countermeasure notification unit 122, the countermeasure information provision unit 124, the effect reception unit, the effect information provision unit 133, the log storage unit 113, the countermeasure storage unit 123, and the effect storage unit 132 can be achieved by a dedicated circuit that achieves the functions of the units.

Some or all of the above example embodiments may be described as the following Supplementary Notes, but are not limited to the following.

Supplementary Note 1

A sharing system including:

a countermeasure reception unit that receives countermeasure information from a countermeasure device generating the countermeasure information representing a countermeasure against an abnormal state in a case where log information representing a security state of a target device indicates the abnormal state;

a countermeasure notification unit that notifies the target device of the received countermeasure information;

an effect reception unit that receives an effect of the countermeasure against the abnormal state from the countermeasure device that determines the effect of the countermeasure from the log information after notification of the countermeasure information; and an effect information provision unit that provides effect information representing the effect to a predetermined effect information provision target.

Supplementary Note 2

The sharing system according to Supplementary Note 1, in which the effect information provision unit does not provide the effect information in a case where a request for the effect information is received and a transmission source of the request for the effect information is not included in the effect information provision target.

Supplementary Note 3

The sharing system according to Supplementary Note 1 or 2, in which the effect information provision unit provides the effect information including countermeasure reference destination information indicating a reference destination of the countermeasure information of the countermeasure whose effect is represented by the effect information, and the sharing system further includes a countermeasure request reception unit that receives a request for the countermeasure information indicated by the countermeasure reference destination information, and a countermeasure information provision unit that provides the countermeasure information to a transmission source of the request for the countermeasure information in a case where the transmission source of the request for the countermeasure information is included in a predetermined countermeasure information provision target.

Supplementary Note 4

The sharing system according to Supplementary Note 3, in which the countermeasure information includes a countermeasure concealing period representing a period during which the countermeasure information is concealed, and the countermeasure information provision unit does not provide the countermeasure information to the transmission source of the request for the countermeasure information in a case where a time when the request for the countermeasure information is received is included in the countermeasure concealing period of the countermeasure information.

Supplementary Note 5

The sharing system according to any one of Supplementary Notes 1 to 4, in which the effect information provision unit provides the effect information including log reference destination information indicating a reference destination of the log information indicating the abnormal state in which the effect indicated by the effect information has occurred, and the sharing system further includes a log request reception unit that receives a request for the log information indicated by the log reference destination information, and a log information provision unit that provides the log information to a transmission source of the request for the log information in a case where the transmission source of the request for the log information is included in a predetermined log information provision target.

Supplementary Note 6

The sharing system according to Supplementary Note 5, in which the log information includes a log concealing period indicating a period during which the log information is concealed, and the log information provision unit does not provide the log information to a transmission source of the request for the log information in a case where a time when the request for the log information is received is included in the log concealing period of the log information.

Supplementary Note 7

The sharing system according to any one of Supplementary Notes 1 to 6, further including:

a log reception unit that receives the log information from the target device; and a log notification unit that notifies the countermeasure device of the log information.

Supplementary Note 8

A countermeasure device including:

a log reception unit that receives log information indicating a security state output from a target device;

a countermeasure generation unit that generates countermeasure information indicating a countermeasure against an abnormal state in a case where the log information indicates the abnormal state;

a countermeasure provision unit that provides the countermeasure information;

an effect determination unit that determines an effect of the countermeasure from post-countermeasure log information that is log information received after the provision of the countermeasure information; and an effect transmitting unit that outputs effect information indicating the effect.

Supplementary Note 9

The countermeasure device according to Supplementary Note 8, in which in a case where the post-countermeasure log information no longer indicates the abnormal state, the effect determination unit determines that the countermeasure is valid as the effect of the countermeasure.

Supplementary Note 10

The countermeasure device according to Supplementary Note 8 or 9, in which in a case where the post-countermeasure log information indicates the abnormal state after a lapse of a predetermined time from when the countermeasure information is provided, the effect determination unit determines that the countermeasure is not valid as the effect of the countermeasure, the countermeasure generation unit generates countermeasure information representing another countermeasure against the abnormal state in a case where it is determined that the countermeasure is not valid, and the countermeasure provision unit provides the countermeasure information representing another countermeasure against the abnormal state.

Supplementary Note 11

A sharing method including:

receiving countermeasure information from a countermeasure device that generates the countermeasure information representing a countermeasure against an abnormal state in a case where when the log information representing a security state of a target device indicates the abnormal state;

notifying the target device of the received countermeasure information;

receiving an effect of the countermeasure against the abnormal state from the countermeasure device that determines the effect of the countermeasure from log information after notification of the countermeasure information; and providing effect information representing the effect to a predetermined effect information provision target.

Supplementary Note 12

The sharing method according to Supplementary Note 11, further including not providing the effect information in a case where a request for the effect information is received and a transmission source of the request for the effect information is not included in the effect information provision target.

Supplementary Note 13

The sharing method according to Supplementary Note 11 or 12, further including:

providing the effect information including countermeasure reference destination information indicating a reference destination of the countermeasure information of the countermeasure whose effect is represented by the effect information;

receiving a request for the countermeasure information indicated by the countermeasure reference destination information; and providing the countermeasure information to the transmission source of the request for the countermeasure information in a case where the transmission source of the request for the countermeasure information is included in a predetermined countermeasure information provision target.

Supplementary Note 14

The sharing method according to Supplementary Note 13, in which the countermeasure information includes a countermeasure concealing period representing a period during which the countermeasure information is concealed, and the sharing method further includes not providing the countermeasure information to the transmission source of the request for the countermeasure information in a case where a time when the request for the countermeasure information is received is included in the countermeasure concealing period of the countermeasure information.

Supplementary Note 15

The sharing method according to any one of Supplementary Notes 11 to 14, further including:

providing the effect information including log reference destination information indicating a reference destination of the log information indicating the abnormal state in which the effect indicated by the effect information has occurred;

receiving a request for the log information indicated by the log reference destination information; and providing the log information to a transmission source of the request for the log information in a case where when the transmission source of the request for the log information is included in a predetermined log information provision target.

Supplementary Note 16

The sharing method according to Supplementary Note 15, in which the log information includes a log concealing period representing a period during which the log information is concealed, and the sharing method further includes not providing the log information to the transmission source of the request for the log information in a case where a time when the request for the log information is received is included in the log concealing period of the log information.

Supplementary Note 17

The sharing method according to any one of Supplementary Notes 11 to 16, further including:

receiving the log information from the target device; and notifying the countermeasure device of the log information.

Supplementary Note 18

An analysis method including:

receiving log information indicating a security state output from a target device;

generating countermeasure information indicating a countermeasure against an abnormal state in a case where the log information indicates the abnormal state;

providing the countermeasure information;

determining an effect of the countermeasure from post-countermeasure log information that is log information received after the provision of the countermeasure information; and outputting effect information representing the effect.

Supplementary Note 19

The analysis method according to Supplementary Note 18, further including determining that the countermeasure is valid as the effect of the countermeasure in a case where the post-countermeasure log information no longer indicates the abnormal state.

Supplementary Note 20

The analysis method according to Supplementary Note 18 or 19, further including:

determining that the countermeasure is not valid as the effect of the countermeasure in a case where the post-countermeasure log information indicates the abnormal state after a lapse of a predetermined time from when the countermeasure information is provided;

generating countermeasure information representing another countermeasure against the abnormal state in a case where it is determined that the countermeasure is not valid; and providing the countermeasure information representing another countermeasure against the abnormal state.

Supplementary Note 21

A storage medium storing a program for causing a computer to execute:

countermeasure reception processing of receiving countermeasure information from a countermeasure device that generates countermeasure information indicating a countermeasure against an abnormal state in a case where log information indicating a security state of a target device indicates the abnormal state;

countermeasure notification processing of notifying the target device of the received countermeasure information;

effect reception processing of receiving the effect from the countermeasure device that determines the effect of the countermeasure against the abnormal state from the log information after notification of the countermeasure information; and effect information provision processing of providing effect information representing the effect to a predetermined effect information provision target.

Supplementary Note 22

The storage medium according to Supplementary Note 21, in which the effect information provision processing does not providing the effect information in a case where a request for the effect information is received and a transmission source of the request for the effect information is not included in the effect information provision target.

Supplementary Note 23

The storage medium according to Supplementary Note 21 or 22, in which the effect information provision processing provides the effect information including countermeasure reference destination information indicating a reference destination of the countermeasure information of the countermeasure whose effect is represented by the effect information, and the program causes a computer to execute:

countermeasure request reception processing of receiving a request for the countermeasure information indicated by the countermeasure reference destination information; and countermeasure information provision processing of providing the countermeasure information to the transmission source of the request for the countermeasure information in a case where the transmission source of the request for the countermeasure information is included in a predetermined countermeasure information provision target.

Supplementary Note 24

The storage medium according to Supplementary Note 23, in which the countermeasure information includes a countermeasure concealing period representing a period during which the countermeasure information is concealed, and the countermeasure information provision processing does not providing the countermeasure information to the transmission source of the request for the countermeasure information in a case where a time when the request for the countermeasure information is received is included in the countermeasure concealing period of the countermeasure information.

Supplementary Note 25

The storage medium according to any one of Supplementary Notes 21 to 24, in which the effect information provision processing provides the effect information including log reference destination information indicating a reference destination of the log information indicating the abnormal state in which the effect indicated by the effect information has occurred, and the program causes a computer to execute:

log request reception processing of receiving a request for the log information indicated by the log reference destination information; and log information provision processing of providing the log information to a transmission source of the request for the log information in a case where the transmission source of the request for the log information is included in a predetermined log information provision target.

Supplementary Note 26

The storage medium according to Supplementary Note 25, in which the log information includes a log concealing period representing a period during which the log information is concealed, and the log information provision processing does not providing the log information to a transmission source of the request for the log information in a case where a time when the request for the log information is received is included in the log concealing period of the log information.

Supplementary Note 27

The storage medium according to any one of Supplementary Notes 21 to 26, in which the program causes a computer to execute:

log reception processing of receiving the log information from the target device; and log notification processing of notifying the countermeasure device of the log information.

Supplementary Note 28

A storage medium storing a program for causing a computer to execute:

log reception processing of receiving log information indicating a security state output from a target device;

countermeasure generation processing of generating countermeasure information indicating a countermeasure against an abnormal state when the log information indicates the abnormal state; countermeasure provision processing of providing the countermeasure information;

effect determination processing of determining an effect of the countermeasure from post-countermeasure log information which is log information received after the provision of the countermeasure effect transmitting processing of outputting effect information indicating the effect.

Supplementary Note 29

The storage medium according to Supplementary Note 28, in which the effect determination processing determines that the countermeasure is valid as the effect of the countermeasure in a case where the post-countermeasure log information no longer indicates the abnormal state.

Supplementary Note 30

The storage medium according to Supplementary Note 28 or 29, in which the effect determination processing determines that the countermeasure is not valid as the effect of the countermeasure in a case where the post-countermeasure log information indicates the abnormal state after a lapse of a predetermined time from when the countermeasure information is provided, and the countermeasure generation processing generates countermeasure information representing another countermeasure against the abnormal state in a case where it is determined that the countermeasure is not valid, and the countermeasure provision processing provides the countermeasure information representing another countermeasure against the abnormal state.

Although the present disclosure has been described with reference to the example embodiments, the present disclosure is not limited to the example embodiments. Various modifications that can be understood by those skilled in the art can be made to the configuration and details of the present disclosure within the scope of the present disclosure.

REFERENCE SIGNS LIST 10 sharing system
100 sharing system
104 step
111 log reception unit
112 log notification unit
113 log storage unit
114 log information provision unit
121 countermeasure reception unit
122 countermeasure notification unit
123 countermeasure storage unit
124 countermeasure information provision unit
131 effect reception unit
132 effect storage unit
133 effect information provision unit
200 target device
300 countermeasure device
310 log reception unit
320 countermeasure generation unit
330 countermeasure provision unit
340 effect determination unit
350 effect output unit
400 notification destination device
1001 processor
1002 memory
1003 storage device
1004 I/O interface
1005 storage medium

What is claimed is:

1. A sharing system comprising:

at least one memory storing a set of instructions; and at least one processor configured to execute the set of instructions to:

receive countermeasure information from a countermeasure device configured to generate the countermeasure information representing a countermeasure against an abnormal state in a case where log information representing a security state of a target device indicates the abnormal state;

notify the target device of the received countermeasure information;

receive an effect of the countermeasure against the abnormal state from the countermeasure device that determines the effect of the countermeasure from the log information after notification of the countermeasure information;

provide effect information representing the effect, including countermeasure reference destination information indicating a reference destination of the countermeasure information of the countermeasure whose effect is represented by the effect information, to a predetermined effect information provision target;

receive a request for the countermeasure information indicated by the countermeasure reference destination information; and provide the countermeasure information to a transmission source of the request for the countermeasure information in a case where the transmission source of the request for the countermeasure information is included in a predetermined countermeasure information provision target.

2. The sharing system according to claim 1, wherein the at least one processor is further configured to execute the instructions not to provide the effect information in a case where a request for the effect information is received and a transmission source of the request for the effect information is not included in the effect information provision target.

3. The sharing system according to claim 1, wherein the countermeasure information includes a countermeasure concealing period representing a period during which the countermeasure information is concealed, and the at least one processor is further configured to execute the instructions not to provide the countermeasure information to the transmission source of the request for the countermeasure information in a case where a time when the request for the countermeasure information is received is included in the countermeasure concealing period of the countermeasure information.

4. The sharing system according to claim 1, wherein the at least one processor is further configured to execute the instructions to:

provide the effect information including log reference destination information indicating a reference destination of the log information indicating the abnormal state in which the effect indicated by the effect information has occurred;

receive a request for the log information indicated by the log reference destination information; and provide the log information to a transmission source of the request for the log information in a case where the transmission source of the request for the log information is included in a predetermined log information provision target.

5. The sharing system according to claim 4, wherein the log information includes a log concealing period indicating a period during which the log information is concealed, and the at least one processor is further configured to execute the instructions not to provide the log information to a transmission source of the request for the log information in a case where a time when the request for the log information is received is included in the log concealing period of the log information.

6. The sharing system according to claim 1, further comprising:

the at least one processor is further configured to execute the instructions to:

receive the log information from the target device; and notify the countermeasure device of the log information.

7. A countermeasure device comprising:

at least one second memory storing a set of instructions; and at least one second processor configured to execute the set of instructions to:

receive log information indicating a security state output from a target device;

generate countermeasure information indicating a countermeasure against an abnormal state in a case where the log information indicates the abnormal state;

provide the countermeasure information;

determine an effect of the countermeasure from post-countermeasure log information that is log information received after the provision of the countermeasure information;

output effect information indicating the effect, wherein the effect information includes countermeasure reference destination information indicating a reference destination of the countermeasure information of the countermeasure whose effect is represented by the effect information;

receive a request for the countermeasure information indicated by the countermeasure reference destination information; and provide the countermeasure information to a transmission source of the request for the countermeasure information in a case where the transmission source of the request for the countermeasure information is included in a predetermined countermeasure information provision target.

8. The countermeasure device according to claim 7, wherein the at least one second processor is further configured to execute the instructions to determine, in a case where the post-countermeasure log information no longer indicates the abnormal state, that the countermeasure is valid as the effect of the countermeasure.

9. The countermeasure device according to claim 7, wherein the at least one second processor is further configured to execute the instructions to determine, in a case where the post-countermeasure log information indicates the abnormal state after a lapse of a predetermined time from when the countermeasure information is provided, that the countermeasure is not valid as the effect of the countermeasure;

generate countermeasure information representing another countermeasure against the abnormal state in a case where it is determined that the countermeasure is not valid; and provide the countermeasure information representing another countermeasure against the abnormal state.

10. A sharing method comprising:

receiving countermeasure information from a countermeasure device that generates the countermeasure information representing a countermeasure against an abnormal state in a case where when the log information representing a security state of a target device indicates the abnormal state;

notifying the target device of the received countermeasure information;

receiving an effect of the countermeasure against the abnormal state from the countermeasure device that determines the effect of the countermeasure from log information after notification of the countermeasure information;

providing effect information representing the effect, including countermeasure reference destination information indicating a reference destination of the countermeasure information of the countermeasure whose effect is represented by the effect information, to a predetermined effect information provision target;

receiving a request for the countermeasure information indicated by the countermeasure reference destination information; and providing the countermeasure information to a transmission source of the request for the countermeasure information in a case where the transmission source of the request for the countermeasure information is included in a predetermined countermeasure information provision target.

11. The sharing method according to claim 10, further comprising not providing the effect information in a case where a request for the effect information is received and a transmission source of the request for the effect information is not included in the effect information provision target.

12. The sharing method according to claim 10, wherein the countermeasure information includes a countermeasure concealing period representing a period during which the countermeasure information is concealed, and the sharing method further includes not providing the countermeasure information to the transmission source of the request for the countermeasure information in a case where a time when the request for the countermeasure information is received is included in the countermeasure concealing period of the countermeasure information.

13. The sharing method according to claim 10, further comprising:

providing the effect information including log reference destination information indicating a reference destination of the log information indicating the abnormal state in which the effect indicated by the effect information has occurred;

receiving a request for the log information indicated by the log reference destination information; and providing the log information to a transmission source of the request for the log information in a case where when the transmission source of the request for the log information is included in a predetermined log information provision target.

14. The sharing method according to claim 13, wherein the log information includes a log concealing period representing a period during which the log information is concealed, and the sharing method further includes not providing the log information to the transmission source of the request for the log information in a case where a time when the request for the log information is received is included in the log concealing period of the log information.

15. The sharing method according to claim 10, further comprising:

receiving the log information from the target device; and notifying the countermeasure device of the log information.

16. A non-transitory computer readable storage medium storing a program for causing a computer to execute:

countermeasure reception processing of receiving countermeasure information from a countermeasure device that generates countermeasure information indicating a countermeasure against an abnormal state in a case where log information indicating a security state of a target device indicates the abnormal state;

countermeasure notification processing of notifying the target device of the received countermeasure information;

effect reception processing of receiving the effect from the countermeasure device that determines the effect of the countermeasure against the abnormal state from the log information after notification of the countermeasure information;

effect information provision processing of providing effect information representing the effect, including countermeasure reference destination information indicating a reference destination of the countermeasure information of the countermeasure whose effect is represented by the effect information, to a predetermined effect information provision target;

countermeasure request reception processing of receiving a request for the countermeasure information indicated by the countermeasure reference destination information; and countermeasure information provision processing of providing the countermeasure information to a transmission source of the request for the countermeasure information in a case where the transmission source of the request for the countermeasure information is included in a predetermined countermeasure information provision target.

17. The non-transitory computer readable storage medium according to claim 16, wherein the effect information provision processing does not provides the effect information in a case where a request for the effect information is received and a transmission source of the request for the effect information is not included in the effect information provision target.

* * * * *